(12) United States Patent
Gauggel et al.

(10) Patent No.: US 8,136,762 B2
(45) Date of Patent: Mar. 20, 2012

(54) INTEGRATED ACOUSTIC DECOUPLING IN A HABITATION MODULE

(75) Inventors: Tobias Gauggel, Riedlingen (DE);
Martin Geldien, Laupheim (DE);
Markus Klingseis, Biberach (DE);
Christian Wesselink, Hamburg (DE)

(73) Assignee: Airbus Operations GmbH (DE)

( * ) Notice: Subject to any disclaimer, the term of this patent is extended or adjusted under 35 U.S.C. 154(b) by 368 days.

(21) Appl. No.: 12/466,516

(22) Filed: May 15, 2009

(65) Prior Publication Data

US 2009/0289146 A1 Nov. 26, 2009

Related U.S. Application Data

(60) Provisional application No. 61/128,404, filed on May 21, 2008.

(30) Foreign Application Priority Data

May 21, 2008 (DE) .......................... 10 2008 024 509

(51) Int. Cl.
*B64D 11/00* (2006.01)
*B64D 11/06* (2006.01)
(52) U.S. Cl. ................................ 244/118.5; 244/118.6

(58) Field of Classification Search ............... 244/118.5, 244/117 R, 1 N, 118.2, 118.6; 181/290; 312/122; 5/8
See application file for complete search history.

(56) References Cited

U.S. PATENT DOCUMENTS

| | | | | |
|---|---|---|---|---|
| 4,109,328 A * | 8/1978 | Mason | ............................... | 5/2.1 |
| 4,487,291 A * | 12/1984 | Walker | ......................... | 181/290 |
| 4,505,078 A | 3/1985 | Huh | | |
| 6,266,936 B1 * | 7/2001 | Gelin | ........................... | 52/481.1 |
| 6,659,225 B2 * | 12/2003 | Olliges et al. | .................. | 182/97 |
| 7,083,145 B2 * | 8/2006 | Mills | ........................... | 244/118.5 |
| 2007/0125909 A1 | 6/2007 | Seiersen et al. | | |
| 2008/0078872 A1 | 4/2008 | Schalla et al. | | |

FOREIGN PATENT DOCUMENTS

DE 3336402 A1 4/1984
DE 102005052229 A1 5/2007

\* cited by examiner

*Primary Examiner* — Milton Nelson, Jr.
(74) *Attorney, Agent, or Firm* — Lerner, David, Littenberg, Krumholz & Mentlik, LLP

(57) ABSTRACT

According to an exemplary embodiment of the invention, a combined habitation module for the crew of an aircraft is provided, which habitation module comprises two monument units that are separated from each other by a gap such that acoustic decoupling of the two monument units from each other is provided. In this way noise propagation within the habitation module may be prevented to a large extent.

15 Claims, 5 Drawing Sheets

INTEGRATED ACOUSTIC DECOUPLING IN A HABITATION MODULE

CROSS-REFERENCE TO RELATED APPLICATIONS

This application claims the benefit of the filing date of U.S. Provisional Patent Application No. 61/128,404 filed on May 21, 2008, the disclosure of which is hereby incorporated herein by reference.

BACKGROUND OF THE INVENTION

The invention relates to habitation modules for aircraft. In particular, the invention relates to a combined habitation module for the crew of an aircraft, to an aircraft comprising such a habitation module, to the use of a habitation module in an aircraft, and to a method for providing a habitation module in an aircraft.

In more recent long-haul commercial aircraft, if desired, the space requirement of the so-called crew rest compartments (CRCs) within the cabin or within the cargo compartment of the aircraft is reduced in that the volume of such CRCs is partly displaced into the space above the cabin ceiling, the so-called crown area. However, climbing up requires space for a ladder or staircase in the cabin.

Furthermore, due to the limited interior height in present-day crown spaces it is not possible to provide seating and change facilities in that region. For this reason a standard monument, as a rule a galley, is designed as a combined galley/rest-compartment unit. In this arrangement the lower segment of the monument represents a galley section or galley module, while in the segment above it the rest compartment with its seating- and change facilities commences (seating module).

Galleys represent a noise source, which can have a disadvantageous effect in particular on nearby rest compartments. The present-day arrangement of the rest compartments above the galleys in this respect represents a retrograde step when compared to the free-standing spaces of earlier generations of aircraft.

SUMMARY OF THE INVENTION

The invention states a habitation module for the crew of an aircraft, an aircraft, the use of a module in an aircraft, and a method for providing a module in an aircraft, according to the characteristics of the independent claims. Further exemplary embodiments of the invention are disclosed in the subordinate claims.

The exemplary embodiments described equally relate to the habitation module, the aircraft, the use, and the method.

According to an exemplary embodiment of the invention, a combined habitation module for the crew of an aircraft is stated, which habitation module comprises a first monument unit for accommodating a first member of the crew, and a second monument unit for use by a second member of the crew. In this arrangement the first monument unit is at least in part arranged above the second monument unit. Furthermore, the first monument unit is separated from the second monument unit by a gap so that acoustic decoupling of the first from the second monument unit is provided.

By providing the gap, mechanical, physical separation of the two monument units may be provided so that vibration or noise development in the one monument unit may not be transmitted to the other monument unit, or so that such a transmission may be strongly attenuated.

In particular in relation to impact sound, merely using sound-insulating mats may only provide limited attenuation. Disturbance of crew members who may be inside a habitation module and who may be asleep, as a result of normal galley operation, is often inadequately attenuated. The normal galley operation in particular also includes trolley impacts against the monument unit.

According to this exemplary embodiment of the invention, two or several monument units or monument components are thus predominantly arranged one on top of the other, and at the same time they are acoustically decoupled from each other. In this arrangement, acoustic decoupling is implemented by physical (mechanical) separation of the individual monument components relative to each other in that there is a gap between the monument units.

According to a further exemplary embodiment of the invention, the first monument unit comprises a first base area, which establishes a first connection to the cabin floor of the aircraft. The second monument unit comprises a second base area, which establishes a second connection to the cabin floor of the aircraft, wherein the second base area is situated within the first base area.

In other words, the two monument units are partially pushed one inside the other so that the two monument units share a common floor area (so-called shared footprint).

After that, both monuments may be attached to the cabin floor and/or the primary structure of the aircraft.

According to a further exemplary embodiment of the invention, the gap is such that transmission of structure-borne sound and audible sound between the two monument units is reduced to an adequate extent so that the crew in the first monument unit can sleep largely undisturbed by the noise generated in the galley.

For example, the gap is designed such that by far the greatest component of structure-borne sound and audible sound (frequencies between 16 Hz and 20 kHz), which sounds arise in the second monument unit, is not transmitted to the first monument unit. Furthermore, according to a further exemplary embodiment of the invention, the gap can be designed for attenuating infrasound propagation (frequencies below 16 Hz) as well as ultrasound propagation (frequencies above 20 kHz). Furthermore, propagation of vibration or impact, which arises in one of the two monument units, to the other monument unit can be prevented or at least attenuated to a very large extent.

According to a further exemplary embodiment of the invention, the first monument unit comprises a structural frame, wherein the second monument unit is designed as a standalone unit that is arranged underneath the structural frame or between two regions of the structural frame.

In other words, the second monument unit is cut off or insulated from the first monument unit, so that the term decapsulation of the noise source may be appropriate.

According to further exemplary embodiment of the invention, the second monument unit is designed to be slid in underneath the first monument unit.

In this arrangement the first monument unit is autonomous and independent of the second monument unit, which is merely slid into a corresponding recess after installation of the first monument unit.

According to a further exemplary embodiment of the invention, spring elements for oscillation insulation between the two monument units are arranged in the gap.

In this way a situation may be achieved in which on the one hand the monument units provide mutual support for each other (if they are coupled together by way of the spring elements), but that nevertheless any oscillations from one monument unit can be transmitted to the other monument unit only in a clearly attenuated manner. The insulation behaviour is in particular also influenced by attenuation of the spring elements. The higher the attenuation, the lower the insulating effect.

The spring elements can, for example, comprise an elastomeric material.

According to a further exemplary embodiment of the invention, a sound-absorbent material is arranged in the gap. In this way the transmission of audible sound can be further reduced.

According to a further exemplary embodiment of the invention, the first monument unit comprises a seating module with seating, a sleeping module with at least one bed, and a first ascent device for climbing from the cabin floor of the aircraft into the seating module.

Moreover, the first monument unit can comprise only one seating module and one ascent module, or only one sleeping module with an ascent device, depending on whether or not a sleeping space or a seating space is required and desirable.

According to a further exemplary embodiment of the invention, the first monument unit comprises a second ascent device for climbing from the seating module into the sleeping module.

In this arrangement the seating space is arranged on a plane that is located between the plane of the sleeping module and the plane of the cabin floor.

According to a further exemplary embodiment of the invention, the first ascent device comprises a ladder or a staircase that is affixed laterally to the first monument unit.

By means of lateral affixation of the ascent device to the monument unit it is possible to prevent a reduction of the base area that is usable by the second monument unit, because the ascent unit is affixed outside the base area.

According to a further exemplary embodiment of the invention, the sleeping module is designed for modular detachable coupling to the seating module. For example, after installation of the first monument unit (without the sleeping module) in the aircraft, the sleeping module can be retrofitted without this requiring replacement of the entire monument unit. To this effect the seating module comprises a wall region that can be folded open or removed when the sleeping module is attached, in order to allow access from the seating module to the sleeping module.

According to a further exemplary embodiment of the invention, the first monument unit comprises a sleeping module, and the second monument unit comprises a seating module, wherein the sleeping module is designed as a module that is structurally independent of the seating module.

The sleeping module may thus represent a module that is structurally independent of the seating module; in other words there is no load-transmitting physical connection between the seating module and the sleeping module. In this sense structure-borne sound decoupling between the two modules is achieved. To this effect the sleeping module is attached to the structure of the aircraft so as to be separate from the seating module.

According to a further embodiment, the sleeping module is separated from the seating module also in relation to audible sound in that in the transition region between the seating module and the sleeping module (i.e. either in the seating module, in the sleeping module, or in the gap between the two) sound-absorbent removable areas are provided as sound-attenuating separating areas. These can be solid doors or flaps, or flexible and sound-absorbent curtains.

According to a further embodiment, the transition between two modules is bridged with the use of a flexible bellows construction (for example in the manner of an accordion).

According to a further exemplary embodiment of the invention, the second monument unit is designed as a galley module. For example, trolleys are stored in the second monument unit.

According to a further exemplary embodiment of the invention, an aircraft with a habitation module as described above is provided.

According to a further exemplary embodiment of the invention, the use of a habitation module as described above in an aircraft is stated.

According to a further exemplary embodiment of the invention, a method for providing a habitation module in an aircraft is stated, in which a first monument unit for accommodating a first crew member of the aircraft is arranged in the aircraft. Furthermore, a second monument unit for use by a second crew member is arranged in the aircraft. In this arrangement the first monument unit is at least partly arranged above the second monument unit, wherein the first monument unit is separated from the second monument unit by a gap so that acoustic decoupling between the first and the second monument units is provided.

Acoustic separation of the seating modules and sleeping modules, for example, of the galley monuments in horizontal direction is not required if the two monument units are arranged one on top of the other and if they are separated from each other by the gap. Furthermore, it is not required for individual seating modules and sleeping modules, arranged side-by-side, and the galley monuments to comprise separate floor areas (base areas). Instead, the base areas of the individual monument units can overlap, when viewed from above, so that acoustic decoupling of the first and of the second monument units is provided.

The invention is based on a fundamental idea that in the combined habitation module a seating module is arranged above a galley module, wherein the galley module is designed as a free-standing box underneath the structural frame of the seating module. In this way the noise source of the galley module is decapsulated.

Below, exemplary embodiments of the invention are described with reference to the figures.

DETAILED DESCRIPTION

Figure 1:
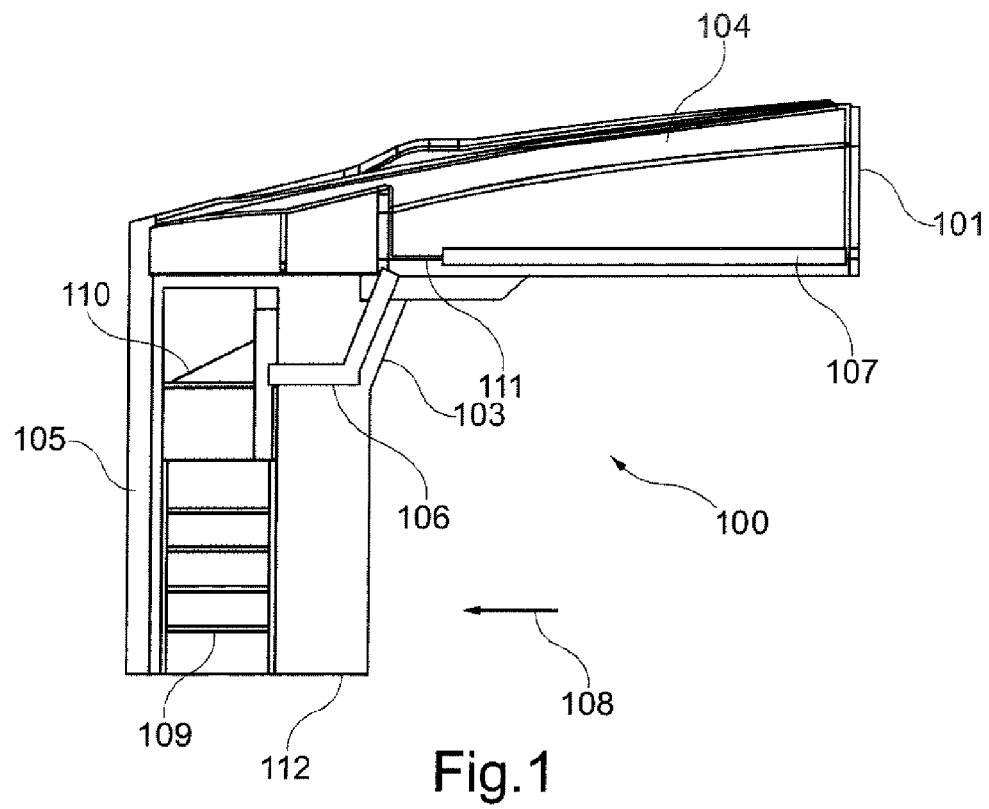
FIG. 1 shows a diagrammatic view of a combined habitation module according to an exemplary embodiment of the invention.

The illustrations in the figures are diagrammatic and not to scale.

In the following description of the figures the same reference characters are used for identical or similar elements.

FIG. 1 shows a lateral view of a combined habitation module 100 for the crew of an aircraft, for example of a commercial aircraft of the type Airbus A350, in particular of an Airbus A350XWB, according to an exemplary embodiment of the invention.

Figure 2:
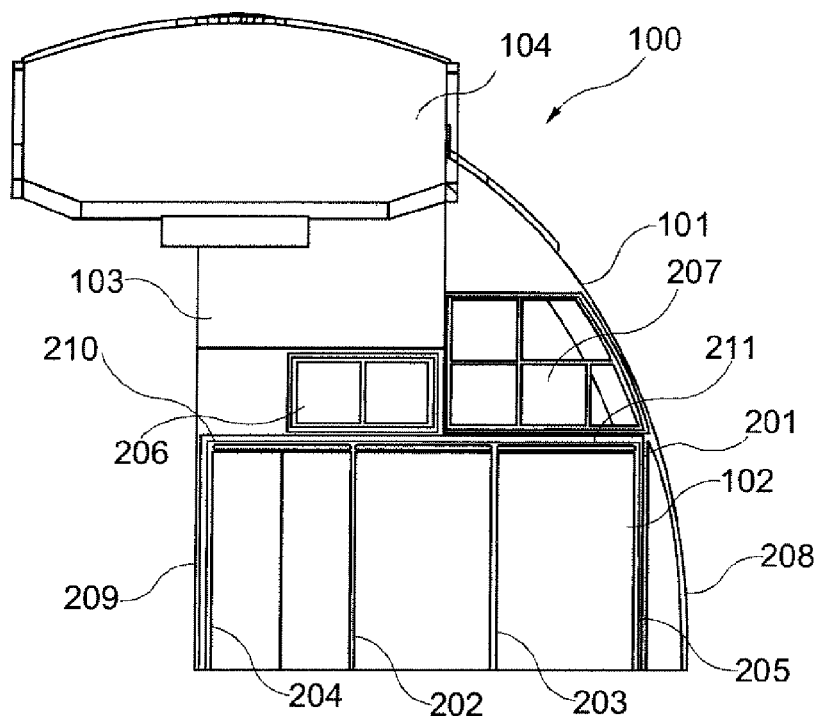
FIG. 2 shows a second diagrammatic view of a habitation module according to an exemplary embodiment of the invention.

The combined habitation module 100 comprises a first monument unit 101 and a second monument unit 102 (see FIG. 2). In this arrangement the first monument unit 101 comprises an ascent module 105, a seating module 103 and a sleeping module 104.

The ascent module 105 is used for climbing from the passenger cabin floor (plane of the base area 112) to the floor 110 of the seating module. The floor 110 of the seating module is thus situated above the cabin floor. For this purpose, for example, a staircase or a ladder 109 is integrated in the ascent module or is affixed laterally to the ascent module.

Furthermore, the seating module 103 comprises one or several seats or other seating space 106. Furthermore, a second staircase or ladder can be provided (not shown in the figures), by means of which the crew member reaches the sleeping module 104 from the floor 110 of the seating module.

One or several beds or bunks or berths 107 are provided in the sleeping module 104.

The floor 111 of the sleeping module 104 is thus above the floor 110 of the seating module.

The arrow 108 designates the direction of flight of the aircraft. The sleeping module 104 thus follows on from the rear of the seating module 103.

FIG. 2 shows a view of the combined habitation module 100 in the direction of flight, in other words seen from the rear. The second monument unit 102, which is, for example, designed as a galley monument, is situated between the limbs 208, 209 of the first monument unit 101 of the habitation module.

In this way the first monument unit 101 can be designed as a structural sub-module. Furthermore, the second monument unit 102 is laterally protected by the limbs 208, 209. During its installation, the second monument unit can simply be pushed between the limbs 208, 209.

The galley monument 102 comprises several perpendicular partition walls and exterior walls 202, 203 or 204, 205.

Between the exterior walls 204, 205 and the lateral limbs 208, 209 of the first monument unit 101 and between the top 210 of the second monument unit 102 and the bottom inside 211 of the first monument unit 101 a vertical or horizontal gap 201 is provided. The gap 201 thus comprises horizontal and vertical sections.

For example, in all the regions the gap comprises the same gap width. In other words, the exterior contour of the second monument unit 102 and the corresponding contour of the first monument unit 101 match each other.

It should be mentioned that while in this exemplary embodiment the second monument unit 102 is designed as a galley monument, the second monument unit 102 can also be some other monument unit and can, for example, provide a habitation compartment or a rest compartment for the crew. Furthermore, it can simply be a storage room for items of baggage or for trolleys.

Furthermore, additional monument units 206, 207 are provided, which are also inserted into the first monument unit 101 during installation, and which comprise, for example, corresponding spring elements and/or if need be sound insulation, in the form of a corresponding material, which sound insulation is arranged in the gap between these additional monument units 206, 207 and the first monument unit 101.

Accordingly, the additional monument units 206, 207 are attached in a mechanically damping manner to the first monument unit 101.

As an alternative to this, the additional monument units 206, 207 can be connected to the second monument unit 102 by way of special support pillars. In this case, attachment of the additional monument units 206, 207 to the first monument unit 101 is not required so that there is no mechanical coupling between the first monument unit 101 and the additional monument units 206, 207. This embodiment is shown in FIGS. 8 and 9.

Figure 8:
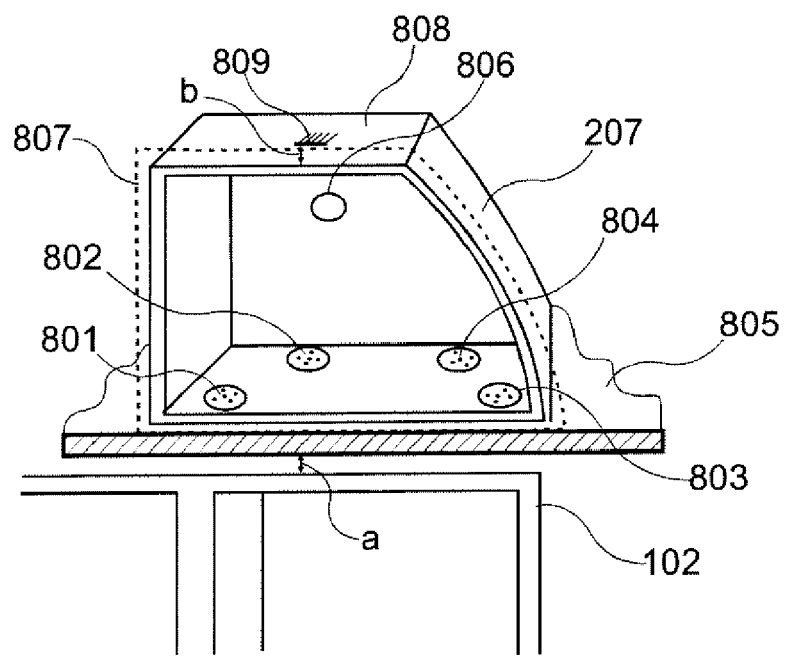
FIG. 8 shows a perspective view of an additional monument unit that is attached to the second monument unit by way of supports.
Figure 9:
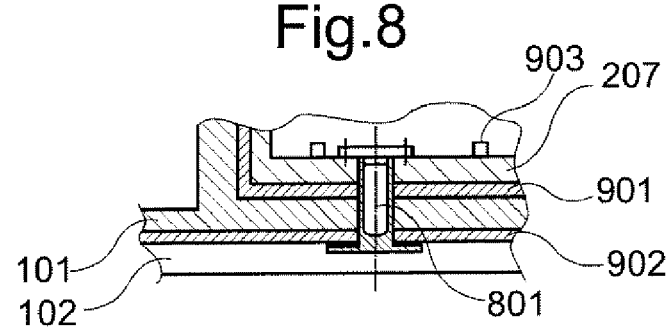
FIG. 9 shows a lateral view of a detail section of FIG. 8.

FIG. 8 shows a perspective view of an additional monument unit 207 that is attached to the second monument unit 102 by way of the pillars 801 to 804.

Insulation 807 can be placed around the additional monument unit 207. Furthermore, if necessary, reinforcement can be provided on a pressure point 806 for taking up x-loads (in other words loads in the direction of flight). The supports 801, 802, 803 and 804 extend through correspondingly larger recesses in the floor 805 of the first, top monument unit. The distance a between the floor 805 of the first monument unit and the top of the second monument unit 102 corresponds to the distance b between the top 808 of the additional monument unit 207 and the corresponding region of the second monument unit (in the diagram indicated by the horizontal line 809).

The additional monument unit 207 (which is, for example, designed in the form of an SU compartment) can be installed from the top above the floor 805 of the first monument unit. The supports 801 to 804 are used to take up z-loads and y-loads (in other words vertical loads and horizontal loads transversely to the direction of flight).

FIG. 9 shows a lateral view of a detail section of FIG. 8. As shown in FIG. 9, the support 801 extends from the additional monument unit 207 through a recess in the first monument unit 101 to the second monument unit 102 where it is attached or simply rests. The reference characters 901 and 902 designate insulation layers between the individual monument units 101, 102, 207. The reference character 903 designates a rail (a so-called SU rail).

Figure 10:
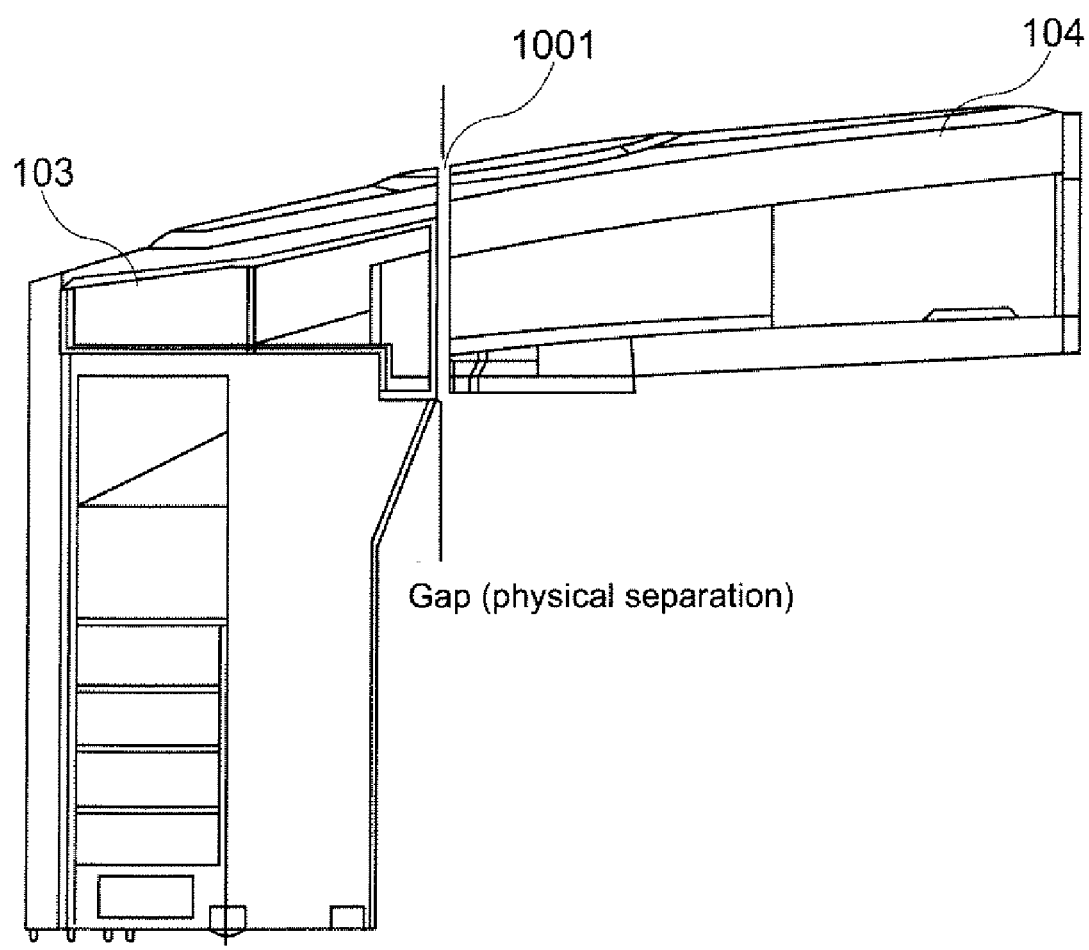
FIG. 10 shows a lateral view of a combined habitation module according to a further exemplary embodiment of the invention.

FIG. 10 shows a lateral view of a combined habitation module according to a further exemplary embodiment of the invention. Between the sleeping module 104 and the seating module 103 there is a gap 1001 so that the sleeping module 104 is a module that is structurally independent of the seating module 103.

Figure 3:
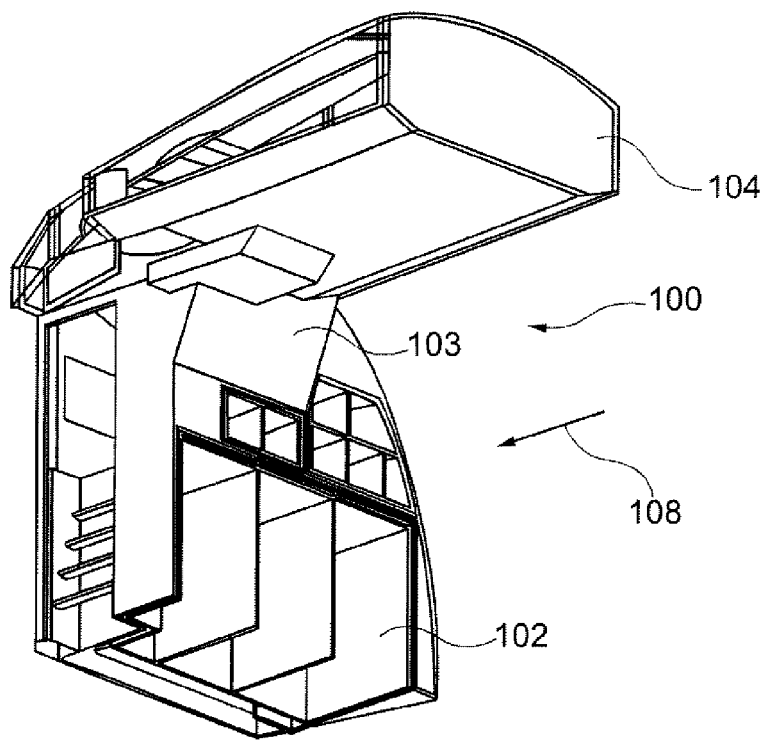
FIG. 3 shows a third view of a habitation module according to an exemplary embodiment of the invention.

FIG. 3 shows a perspective view of a combined habitation module 100 obliquely from below (in relation to the direction 108 of flight). The module of FIG. 3 corresponds to the modules of FIGS. 1 and 2.

Figure 4:
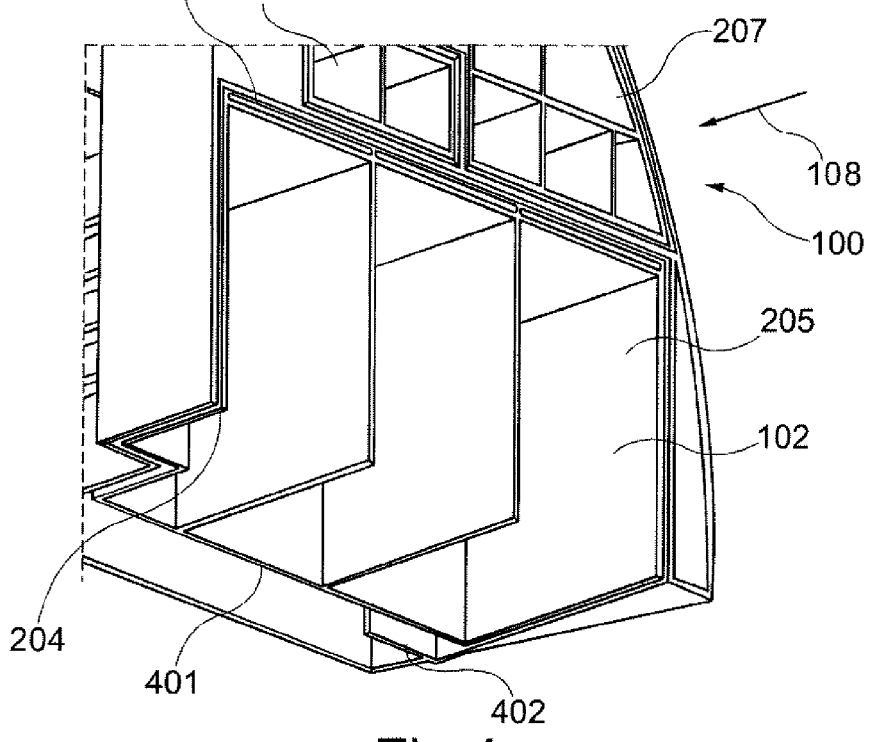
FIG. 4 shows a partial enlargement of a region of a habitation module according to an exemplary embodiment of the invention.

FIG. 4 shows an enlarged section of a partial region of the module of FIGS. 1 to 3, also viewed obliquely from below. As shown in FIG. 4, all the walls of the second monument unit 102 (the sidewalls 204, 205 and the rear wall 401) and the top 210 are separated from the first monument unit 101 by a gap.

The same also applies to the pushed-in additional modules 206, 207.

In other words the exterior walls of the galley module are separated from the corresponding walls of the seating module by the gap.

For example, in the region 402 on the rear of the galley module 102 the gap can be wider than in other regions. In this way it is possible that the galley module, if desired, is pushed still further underneath the first monument unit 101. It is also possible for this gap to be used to guide lines (supply lines, waste disposal lines).

Figure 5:
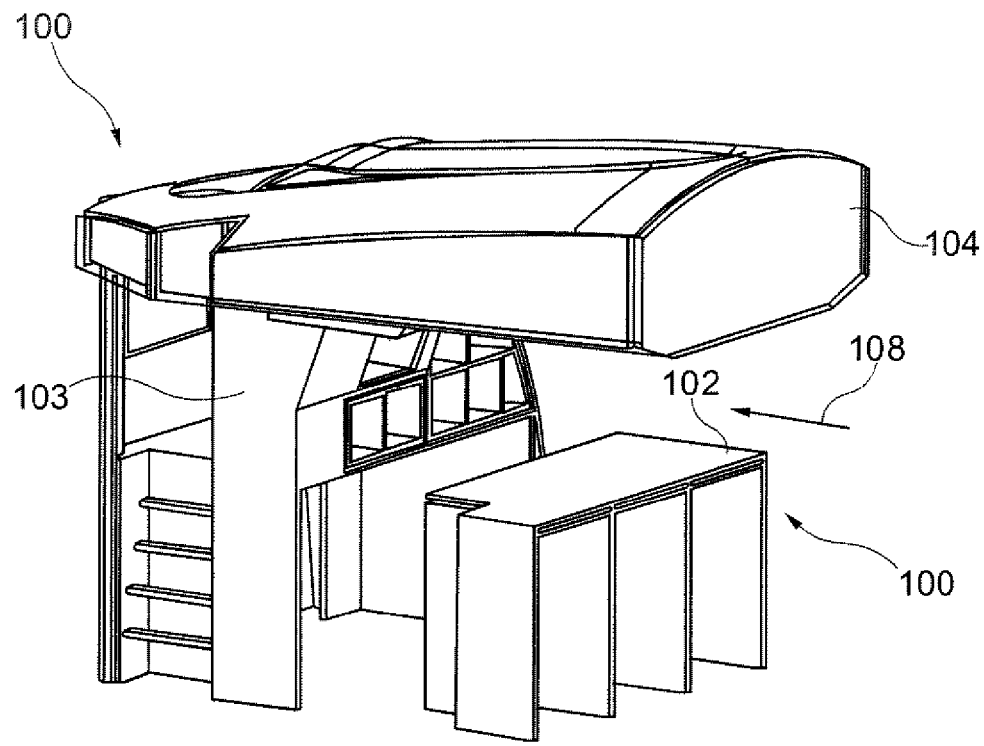
FIG. 5 shows a combined habitation module according to an exemplary embodiment of the invention prior to assembly.

FIG. 5 shows a perspective view of the combined habitation module 100 before the galley module 102 is installed in the first monument unit underneath the seating module 103. After the galley module has been pushed in underneath the seating module, the two modules can be affixed on a shared base area.

The galley module is otherwise completely separated from the remaining crew rest compartment/habitation compartment.

Figure 6:
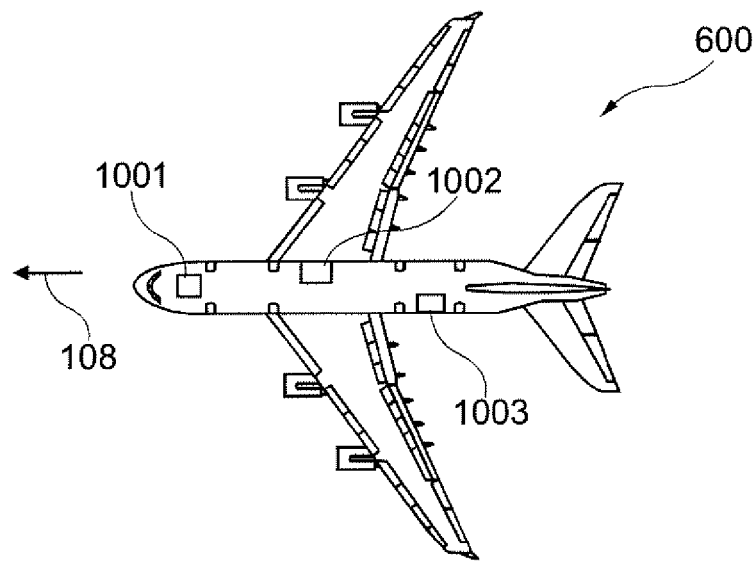
FIG. 6 shows a diagrammatic view of an aircraft with modules according to an exemplary embodiment of the invention.

FIG. 6 shows an aircraft 600 comprising three combined habitation modules according to an exemplary embodiment of the invention. A first habitation module 1001 is arranged behind the cockpit. A second habitation module 1002 is arranged on the right-hand side of the passenger cabin at the height of the aerofoils, while a third habitation module 1003 is arranged in the aft region of the aircraft on the left-hand side of the passenger cabin. Other positions for installing the modules are also possible. Of course, additional modules 100 can also be integrated in the aircraft.

Figure 7:
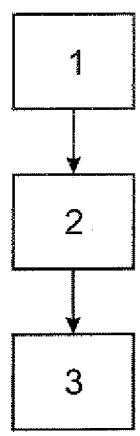
FIG. 7 shows a flow chart of a method according to an exemplary embodiment of the invention.

FIG. 7 shows a flow chart of a method according to an exemplary embodiment of the invention, in which in step 1 a first monument unit for accommodating a first member of the crew of the aircraft is installed. In a second step a second monument unit (for example a galley monument) for use by a second member of the crew is installed underneath or within the first monument unit. The two monument units are separated by a gap in such a way that propagation of sound, in particular also structure-borne sound, between the modules is prevented or at least considerably attenuated.

In a third step, after installation of the two monument units, a sleeping module is connected to the first monument unit. This connection can be established at a later stage without it being necessary to deinstall the first two monument units for this purpose.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A combined habitation module for a crew of an aircraft, the habitation module comprising:
    a first monument unit for accommodating a first crew member;
    a second monument unit for use by a second crew member;
    wherein the first monument unit is at least partly arranged above the second monument unit;
    wherein the first monument unit is separated from the second monument unit by a gap so that acoustic decoupling between the first and the second monument units is provided; and
    wherein the first monument unit and the second monument unit are affixed on a shared base area when installed in the aircraft.

2. The habitation module of claim 1,
    wherein the two monument units have a shared footprint.

3. The habitation module of claim 1,
    wherein the gap reduces transmission of structure-borne sound and audible sound between the two monument units.

4. The habitation module of claim 1,
    wherein the first monument unit comprises a structural frame and the second monument unit is designed as a standalone unit that is arranged underneath the structural frame or between two regions of the structural frame of the first monument unit.

5. The habitation module of claim 1,
    wherein the second monument unit is designed to be slid in underneath the first monument unit.

6. The habitation module of claim 1, further comprising:
    spring elements arranged in the gap for oscillation insulation between the two monument units.

7. The habitation module of claim 1, further comprising:
    a sound-absorbent material;
    wherein the sound-absorbent material is arranged in the gap.

8. The habitation module of claim 1,
    wherein the first monument unit comprises a seating module with seating, a sleeping module with at least one bed, and a first ascent device for climbing from a cabin floor into the seating module.

9. The habitation module of claim 8,
    wherein the first monument unit comprises a second ascent device for climbing from the seating module to the sleeping module.

10. The habitation module of claim 8,
    wherein the first ascent device comprises a ladder or a staircase that is affixed laterally to the first monument unit.

11. The habitation module of claim 8,
    wherein the sleeping module is designed for modular detachable coupling to the seating module.

12. The habitation module of claim 1,
    wherein the first monument unit comprises a sleeping module, and wherein the second monument unit comprises a seating module; and
    wherein the sleeping module is designed to be structurally independent of the seating module.

13. The habitation module of claim 1,
    wherein the second monument unit is a galley module.

14. An aircraft with a habitation module of claim 1.

15. A method for providing a habitation module in an aircraft, comprising the steps of:
    arranging a first monument unit for accommodating a first crew member;
    arranging a second monument unit for use by a second crew member;
    affixing the first monument unit and the second monument unit on a shared base area when installed in the aircraft;
    wherein the first monument unit is at least partly arranged above the second monument unit; and
    wherein the first monument unit is separated from the second monument unit by a gap so that acoustic decoupling between the first and the second monument units is provided.

* * * * *